METALLIC LAMINATED SUPERCONDUCTORS

Filed Nov. 29, 1966 3 Sheets-Sheet 1

Inventor:
HENRY C. SCHINDLER
BY Abraham Sherman
Attorney

Inventor:
HENRY C. SCHINDLER
By Abraham Sherman
Attorney

Inventor:
HENRY C. SCHINDLER
By Abraham Sherman
Attorney

United States Patent Office 3,458,293
Patented July 29, 1969

3,458,293

METALLIC LAMINATED SUPERCONDUCTORS

Henry C. Schindler, East Brunswick, N.J., assignor to Radio Corporation of America, a corporation of Delaware Filed Nov. 29, 1966, Ser. No. 597,661
Int. Cl. B21c *37/00*
U.S. Cl. 29—194 7 Claims

ABSTRACT OF THE DISCLOSURE

A superconductive laminate comprising a flexible filamentary substrate having a superconductive coating, a solder-wettable film over the coating, and a layer of solder on the film, the substrate thus coated being bonded to at least one metallic ribbon by the solder.

BACKGROUND OF THE INVENTION

Field of the invention

This invention relates to improved filamentary laminated superconductive materials useful in the fabrication of superconductive solenoids and magnets.

Superconducting materials are classified as Type I, also known as "soft" superconductors, and Type II, also known as "hard" superconductors. Type I superconductors such as lead and tin change from the superconductive state to the normal state in a relatively low magnetic field, while Type II superconductors such as niobium and tantalum remain superconductive in relatively high magnetic fields. Superconductive materials of Type II have been utilized to fabricate electromagnets which develop strong magnetic fields at cryogenic temperatures while dissipating very little power, as described by T. G. Berlincourt, "High Magnetic Fields by Means of Superconductors," British Journal Applied Physics, volume 14, p. 749, 1963.

Description of the prior art

During the operation of superconducting magnets, the superconductive material is frequently "quenched," that is, changed from the superconductive zero-resistivity state to the normal resistivity state. Each time the magnet coil is thus quenched, the energy of the magnetic field must be dissipated. For this purpose, it is advantageous to have the superconductive wire or ribbon coated by or in contact with a non-superconductive metal which is a good conductor of heat and electricity. The conductive metal serves as a shunt when a small portion of the magnet changes to the normal resistivity state. The conductive metal also serves as a heat sink to remove the undesired heat which is locally generated whenever flux motion occurs in the superconductor. Suitable non-superconductive metals for this purpose are gold, silver, copper and aluminum. The use of copper and aluminum is preferred, not only because of lower costs, but also because there electrical conductivity at cryogenic temperatures (temperatures around 4.2° K.) increases many-fold as compared to their conductivity at room temperature.

Superconductive wires have also been provided with a thin electroplated coating of a metal such as copper, silver or gold which, relative to the superconductor, serves as an electrical insulator. By way of explanation, since the electrical resistivity of a superconductor at a temperature below its characteristic critical temperature $T_c$ and in a magnetic field less than its characteristic critical field $H_c$ is less than can presently be measured, the thin copper coating, which would ordinarily be considered an electrical conductor, acts as an insulator to prevent shorting between adjacent turns and layers of the superconductive magnet. For details, see for example T. H. Geballe, U.S. Patent 3,109,963, issued Nov. 5, 1963. While such thin electroplated copper coatings are satisfactory as insulators for superconductive solenoids, they are not entirely satisfactory for the protection of a superconductive magnet which changes from the superconductive state to the normal resistivity state. First, the electroplated coatings of copper and the like are limited as to the thickness of the flexible coating which can be deposited, whereas it is desirable for magnet protection to have a relatively thick flexible coating of the non-superconductive metal. Second, ordinary electroplated copper is not highly pure, and has residual internal stress. As a result, the conductivity of such electroplated copper coatings increases by a factor of only about 80 at liquid helium temperature (about 4.2° K.) as compared to room temperature. In contrast, a good grade of oxygen-free high-conductivity copper will increase in conductivity by a factor of as much as 200 to over 300 at liquid helium temperature as compared to room temperature. A good grade of aluminum increases in conductivity by a factor of about 300 to 2000 at liquid helium temperature as compared to room temperature. For operation at high magnetic fields, aluminum is preferred because it has a low magneto-resistance. Attempts to clad superconductive wires or ribbons with non-superconductive metals have not hitherto been satisfactory.

Accordingly, it is an object of this invention to provide improved laminated superconductive materials.

SUMMARY OF THE INVENTION

A laminate is provided comprising a flexible filamentary substrate such as a wire or ribbon or tape having a coating of superconductive material, e.g., niobium stannide, or the like. Over the superconductive coating is a thin metallic film which is readily wetted by soft solder. Over the wettable film is a layer of soft solder. At least one metallic ribbon is bonded to the coated substrate by the layer of soft solder. According to one embodiment, two metallic ribbons are bonded to opposing sides of the coated flexible substrate by the layer of soft solder. According to another embodiment, the laminate consists of two filamentary substrates coated with superconductive material and bonded to opposing sides of a metallic ribbon by a layer of soft solder. According to still another embodiment, a plurality of such coated filamentary substrates are bonded in this manner between a plurality of metallic ribbons. A non-superconductive metallic filament having high tensile strength may be included to strengthen the composite laminate. When these filamentary laminates are formed into superconductive solenoids or magnets, the removal of electrical and thermal energy from the magnet is facilitated by the metallic ribbons.

BRIEF DESCRIPTION OF THE DRAWING

The invention will be described in greater detail by the following examples, considered in conjunction with the accompanying drawing, in which.

DESCRIPTION OF THE PREFERRED EMBODIMENTS

Example I

While the superconductive material utilized in superconductive magnets may be a solid wire or ribbon of superconductive material such as niobium-titanium alloy or niobium-zirconium alloy or molybdenum-rhenium alloy, for very high field magnets it is preferred to utilize as the superconductive material an intermetallic Type II superconductor such as niobium stannide ($Nb_3Sn$), vanadium stannide ($V_3Sn$), vanadium gallium ($V_3Ga$), tantalum stannide ($Ta_3Sn$), and the like. The superconductor with the highest critical temperature (18.2° K.) presently available is niobium stannide (also known as niobium tin). An important parameter of niobium stannide for magnet applications is its high upper critical magnetic field $H_{c2}$, which is the characteristic value of magnetic field above which niobium stannide ceases to be superconducting, even at temperatures below its critical temperature. For a detailed discussion of niobium stannide and its properties, see the September 1964 issue of the RCA Review. However, these Type II superconductive materials are too hard and brittle to be used conveniently in the form of solid wires or ribbons. An improved vapor-phase method of depositing superconductive niobium stannide coatings on flexible substrates has been described in Hanak and Cooper U.S. Patent 3,268,362, issued Aug. 23, 1966. In this example, the superconductive material consists of a flexible filamentary substrate such as a wire or tape having a thin flexible coating of a Type II superconductive material. The substrate is preferably a non-superconductive metal or alloy such as nickel, molybdenum, alloys of these, stainless steel, and the like, while the superconductive coating is preferably niobium stannide deposited as described in U.S. Patent 3,268,362.

Figures 1, 11, 12:
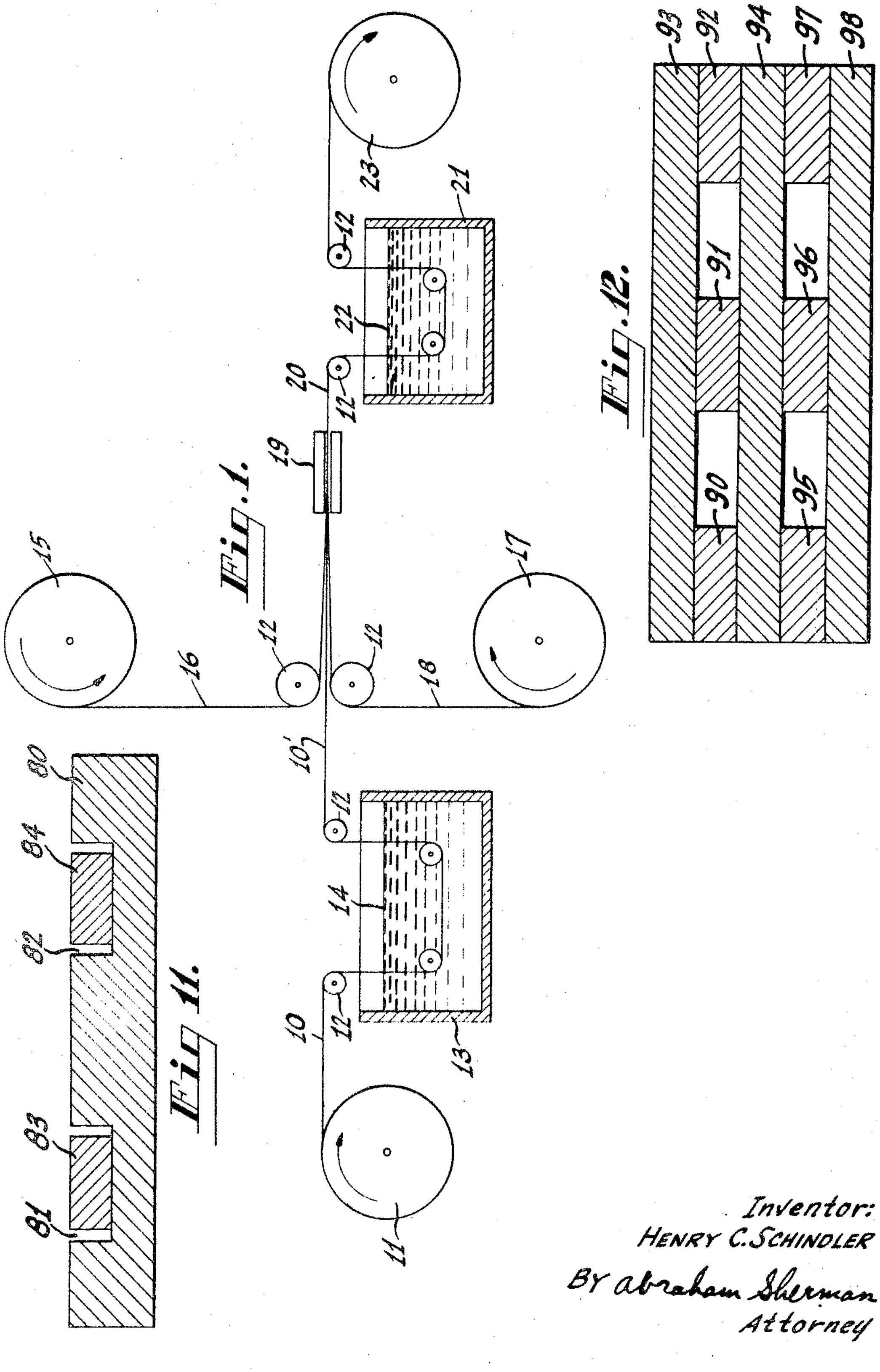
FIGURE 1 is a schematic drawing illustrating the fabrication of a superconductive laminate according to one embodiment of the invention.
FIGURES 6–12 are cross-sectional views of superconductive laminations according to other embodiments.

Referring now to FIGURE 1, the flexible filamentary coated substrate 10 is unwound from a reel 11. The substrate 10 at this stage includes a tape core of a metallic non-superconductor having high tensile strength, e.g., stainless steel. The precise size and shape of substrate 10 is not critical, so that the cross-section of the substrate may be rectangular, or square, or oval, or other. In this example, the substrate 10 is about 1 to 5 mils thick and 90 mils wide. Over the tape core is a superconductive coating consisting of niobium stannide. The precise thickness of the superconductive coating is not critical, and may suitably be about 0.1 to 1.5 mils. In this example, the superconductive niobium stannide coating is about 0.3 mil thick. Over the superconductive coating is a thin film of a metal which is readily wetted by soft solder. The solder-wettable film may for example consist of nickel or cobalt or the like. The precise thickness of the solder-wettable film is not critical, and may be about 0.01 to 0.5 mil. In this example, the solder-wettable film consists of nickel, is about 0.1 mil thick, and is deposited by electroplating.

The coated filamentary substrate 10 is guided by rollers 12 and passes into a bath 13 containing a molten soft solder 14. The molten solder 14 may for example consist of lead, tin, indium, gallium, zinc, cadmium, silver, and/or alloys of these materials. These molten soft solders do not wet Type II superconductors evenly, and hence are not satisfactory when applied directly to a "hard" or Type II superconductor such as niobium stannide. However, these molten soft solders will provide a continuous uniform solder coating about 0.1 to 0.5 mil thick over the thin metallic solder-wettable film because the film consists of material specifically selected to be readily wetted by the molten soft solder 14. The solder-coated filamentary substrate which passes out of the bath 13 is designated 10′ in the drawing.

While the filamentary substrate 10 is receiving a coating of soft solder in the bath 13, two metallic ribbons

16 and 18 are unwound from reels 15 and 17 respectively. The metallic ribbons 16 and 18 suitably consist of copper, silver, gold, aluminum, or the like. The precise size and shape of ribbons 16 and 18 is not critical, but preferably the width of ribbons 16 and 18 is at least as great as the width of filament 10. In this example, the ribbons 16 and 18 are about 90 mils wide, about 1 to 10 mils thick, and consist of an oxygen-free high-conductivity grade of copper. The metallic ribbons 16 and 18 are guided by rollers 12 toward opposing sides of the solder-dipped filament 10′. The metallic ribbons 16 and 18, with the solder-dipped filament 10′ between them, are guided into a pressure jig 19. The jig 19, which may for example consist of two spring loaded or weighted shoes, is maintained at a temperature sufficient to soften the solder layer on the flexible filament. The passage through jig 19 thus bonds the solder-coated filament 10′ between the two ribbons 16 and 18 to form a laminate 20.

The laminate 20 is guided by rollers 12 from the pressure jig 19 into a bath 21 containing a cleaning agent 22 such as methyl alcohol. If desired, several etching and washing baths may be utilized at this stage. The washed and finished laminate 20 leaves the cleaning tank 21 and is wound on a take-up reel 23.

Figure 2:
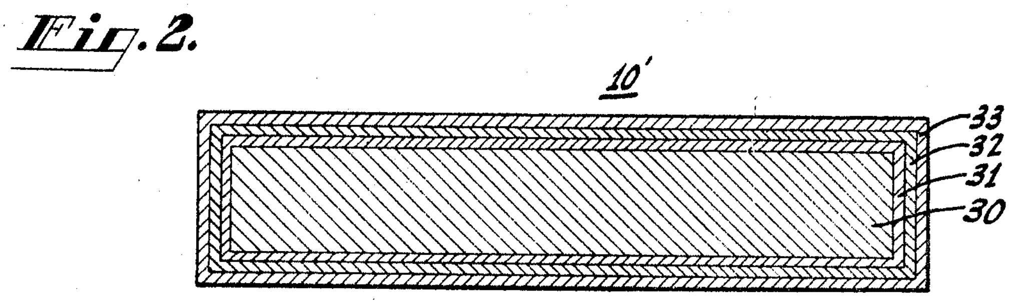
FIGURES 2 and 3 are cross-sectional views illustrating successive stages in the fabrication of a superconductive laminate according to the first embodiment.

The solder-coated filamentary substrate 10′ is shown in cross-section in FIGURE 2, and includes a stainless steel tape core 30 of rectangular shape. Over the tape core 30 is a superconductive coating 31 of niobium stannide. Over the superconductive coating 31 is a film 32 of a metal (nickel in this example) which is readily wetted by soft solder. Over the film 32 is a layer 33 of soft solder.

Figure 3:
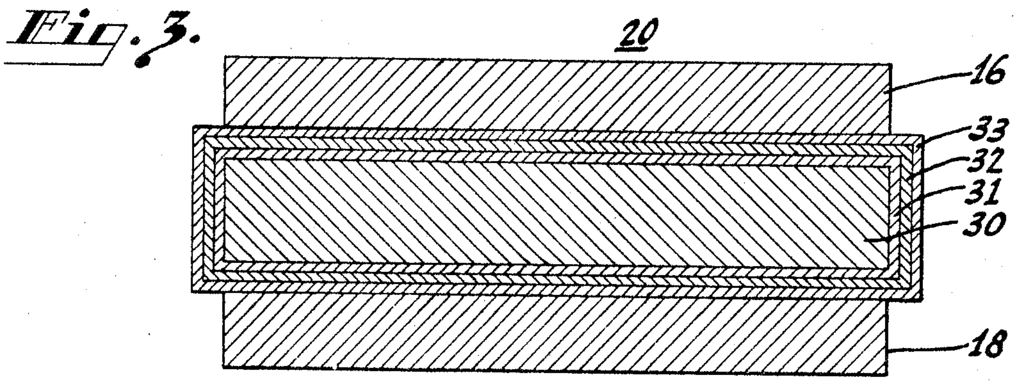

FIGURE 3 is a cross-sectional view of the laminate 20, consisting of the central non-superconductive metallic filament or tape 30; the coating 31 of a Type II superconductor (niobium stannide in this example) on the filament 30; the thin film 32 over coating 31 consisting of a metal (nickel in this example) which is readily wetted by soft solder; a layer 33 of soft solder on the solder-wettable film 32; and the two copper ribbons 16 and 18 bonded to opposing sides of the coated filament 30 by the solder layer 33.

The laminate 20 thus formed has several important advantages when used to make superconductive magnets. First, it contains, as the ribbons 16 and 18, thicker layers of non-superconductive protecting metal than can be formed by prior art electroplating methods. Second, since the ribbons 16 and 18 are made of high purity metal, the resistance ratio of the ribbons at room temperature and at 4.2° K. can be specified and tested prior to bonding. Moreover, their electrical conductivity increases more sharply at 4.2° K. as compared to room temperature than conventional electroplated coatings. In this example, the conductivity of the copper ribbons 16 and 18 is increased by a factor of about 200 at 4.2° K. as compared to room temperature. This high resistance ratio cannot be obtained by prior art conventional electroplating methods.

Example II

In the previous example, the metallic film 32 which is readily wetted by molten solder consisted of a single metal. In the present example, a composite material is utilized for this purpose.

Figure 4:
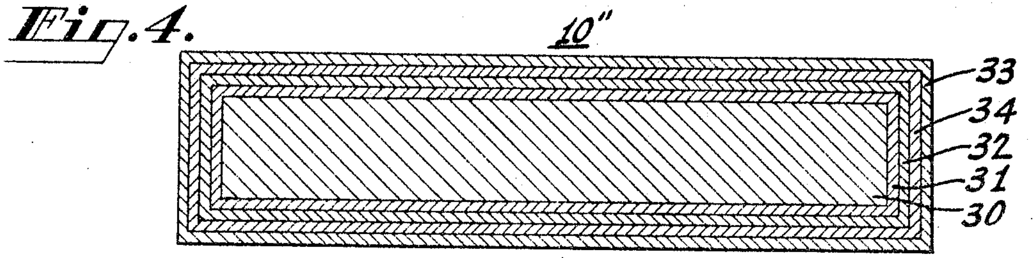
FIGURES 4 and 5 are cross-sectional views illustrating successive stages in the fabrication of a superconductive laminate according to a second embodiment.

The flexible filamentary substrate 10″ which is utilized in this example is shown in cross-section in FIGURE 4. The solder-dipped filament comprises a tape 30 consisting of a metallic non-superconductor; a coating 31 of a Type II superconductor over the substrate 30; a nickel or cobalt flash 32 over the superconductive coating 31; a silver flash 34 over the nickel flash 32; and a layer of soft solder 33 over the silver flash 34.

The flexible filamentary substrate is passed into the bath 13 (FIGURE 1) containing molten soft solder 14 as in the previous example, and after acquiring a coating of soft solder is guided by rollers 12 between two metallic ribbons 16 and 18 into a pressure jig 19. The ribbons 16 and 18 may consist of aluminum, or may consist of copper as in the previous example. On passing through the pressure jig 19, the filament and the two ribbons are united into a laminate.

Figure 5:
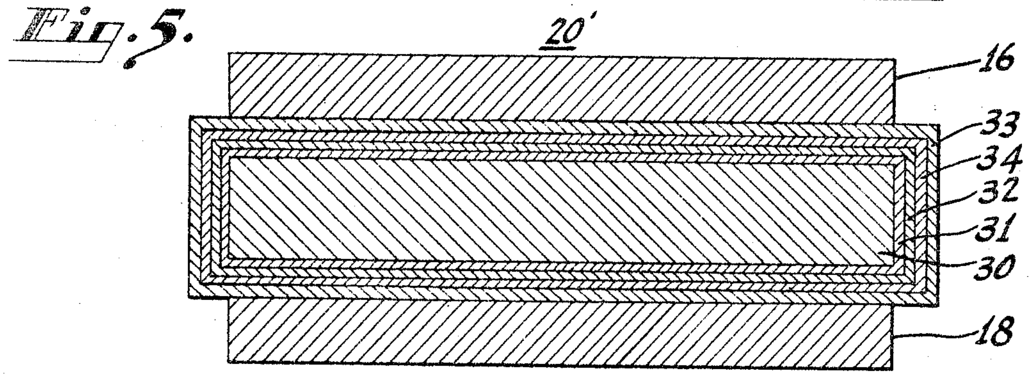

FIGURE 5 is a cross-sectional view of the laminate 20' in this example. The laminate 20' comprises the central flexible filamentary substrate 30 consisting of a metallic non-superconductor; a coating 31 of a Type II superconductor such as niobium stannide or the like on the substrate 30; a nickel flash 32 on the superconductive coating 31; a silver flash 34 on the nickel flash 32; a solder layer 33 on the silver flash 34; and two metallic ribbons 16 and 18 bonded to opposing sides of the substrate 30 by the solder layer 33.

Although the solder used may be superconductive, as described in U.S. Patent 3,184,303, such solder is a Type I superconductor, and hence is not effective as a superconductor at high magnetic fields.

Example III

In the previous examples, the two metallic ribbons utilized were as wide as the flexible filament to which they were bonded. If desired, the flexible filament may be bonded between two metallic ribbons which are wider than the filament itself, and hence the filament may be enclosed between the two metallic ribbons.

Figure 6:
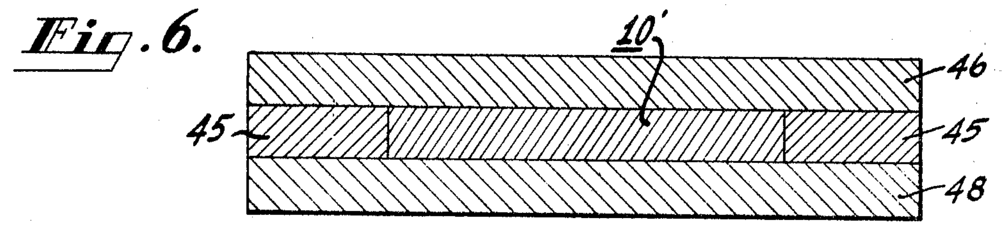

Referring now to FIGURE 6, the flexible coated filamentary substrate 10' in this example is about 90 mils wide. The several coatings on substrate 10' are not shown in FIGURE 6 for greater clarity, but it will be understood that the coated substrate 10' in cross section is similar to the coated substrate illustrated in FIGURE 2, and includes a layer of Type II superconductor such as niobium stannide, a film of a solder-wettable metal over the superconductive layer, and a coating of soft solder over the wettable film. By means of the process described in Example I and illustrated in FIGURE 1, the coated substrate 10' is bonded between two metallic ribbons 46 and 48, which are each about 150 mils wide. On passing through the pressure jig 19 (FIGURE 1), the two ribbons 46 and 48 are soldered together at the edges by some of the excess solder 45 squeezed out of the solder coating as shown in FIGURE 6, so that the coated filament 10' is enclosed between them.

Example IV

In the previous example, only one filament was laminated between two metallic ribbons. In the present example, a plurality of such coated filaments are bonded between two metallic ribbons.

Figure 7:
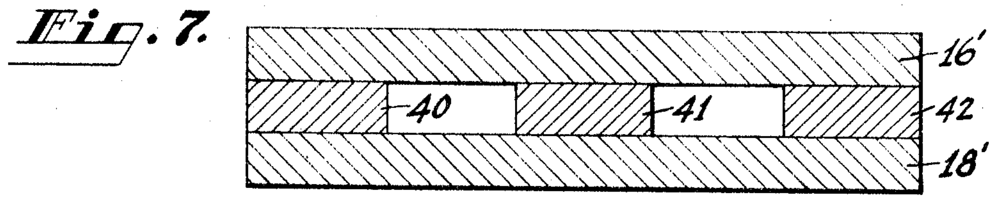

Referring now to FIGURE 7, three coated filaments 40, 41, and 42 formed as described in Example 1 for Example II are bonded as described in Example I between two copper ribbons 16' and 18' so that the three filaments are parallel to each other and in the same horizontal plane. The coatings on each filament are not shown in FIGURE 7 for greater clarity, but it will be understood that each coated filament is similar in cross section to the coated filament illustrated in FIGURE 2 or in FIGURE 4. In this example, each of the filaments 40, 41 and 42 are 90 mils wide, while the metallic ribbons 16' and 18' are about 450 mile wide. The current-carrying capacity of the flexible laminate thus formed is three-fold the current-carrying capacity of the laminate of Example I.

Example V

In the previous example, a plurality of coated flexible filaments were bonded between two metallic ribbons. In order to obtain a maximum amount of protection for the magnet, one or more superconductive filaments may be bonded between two metallic ribbons along with a filament of a metallic non-superconductor, which may for example consist of the same material as the ribbons.

Figure 8:
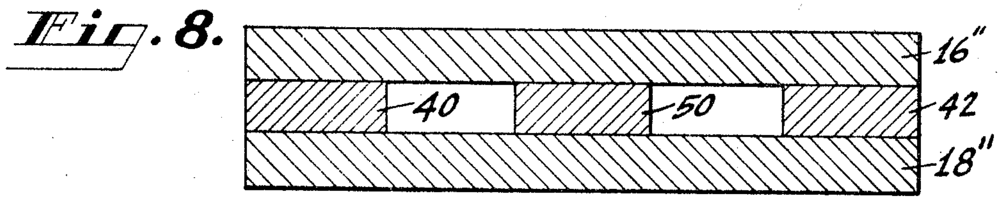

Referring now to FIGURE 8, the laminate in this example consists of two flexible filaments 40 and 42 which are coated with a Type II superconductor, a wettable metallic film, and a layer of soft solder as described in Example IV. These coatings are not shown in FIGURE 8 for greater clarity, but it will be understood that in cross section the coated filaments 40 and 42 are like the coated filaments illustrated in FIGURE 2 or FIGURE 4. Another flexible filament 50 of a non-superconductive metal such as copper is prepared. The three filaments 40, 42 and 50 need not have the same width, but preferably have the same thickness. The three filaments 40, 42 and 50 are solder coated and aligned parallel to each other in the same horizontal plane, then bonded by the method described in Example I between two flexible metallic ribbons 16" and 18", which suitably consist of copper in this example.

Example VI

Figure 9:
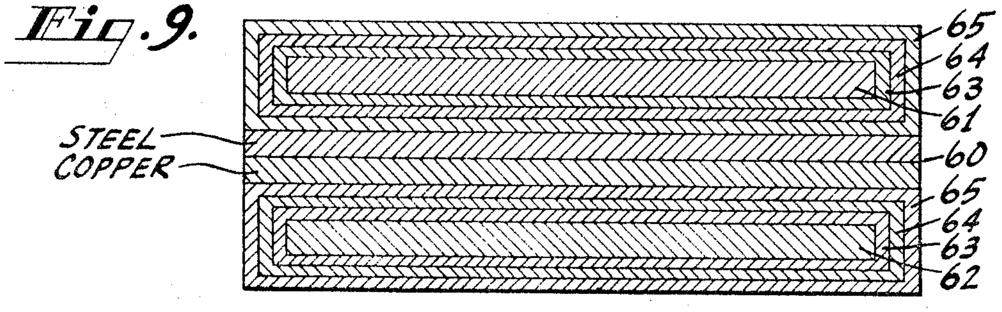

In Example I, a coated flexible filamentary substrate was sandwiched between two metallic ribbons. The inverse sandwich may be made in a similar manner, but having a single metallic ribbon sandwiched between two flexible superconductive filamentary substrates. Referring now to FIGURE 9, the metallic ribbon 60 utilized in this example is itself a laminate of oxygen-free high-conductivity copper and a high tensile strength alloy such as stainless steel. Two coated flexible filaments 61 and 62 are bonded to opposing sides of metallic ribbon 60. Each of filaments 61 and 62 has a coating 63 of niobium stannide, a film 64 of nickel over the coating, with a layer 65 of soft solder over the film. The solder 65 bonds the two filaments to the copper-clad steel ribbon 60.

Example VII

Figure 10:
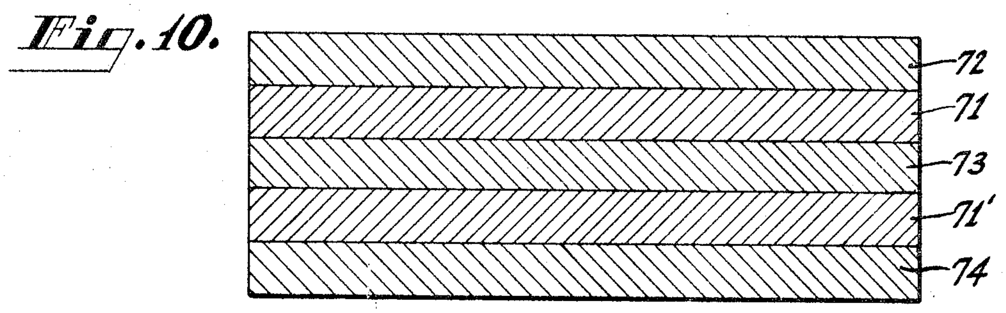

In Example IV a plurality of coated filaments were aligned parallel to each other in a horizontal plane, and bonded between metallic ribbons. In this example, a plurality of coated filaments are aligned in a vertical plane and bonded between metallic ribbons. Referring now to FIGURE 10, two coated flexible filaments 71 and 71' are aligned vertically. Each filament 71 and 71' has a coating of a Type II superconductor such as niobium stannide, a film of a solder-wettable metal such as nickel or cobalt over the superconductive coating, and a layer of soft solder over the solder-wettable film. The various coatings on the filaments are not shown for greater clarity. Bonding is accomplished by passing the coated filaments (71 and 71') and the metallic ribbons (72 and 73 and 74) through a heated jig as described in Example I.

Example VIII

In this example, a slot is milled into a face of a metallic ribbon, and a coated filament is aligned inside the slot. An advantage of this embodiment is that each such filament is locked into position. Referring now to FIGURE 11, a metallic ribbon 80, which may for example be aluminum or copper, is provided with slots 81 and 82 extending lengthwise in one face. Two coated flexible filaments 83 and 84 are aligned within the slots 81 and 82 respectively. Each of filaments 83 and 84 has a coating of a Type II superconductor such as niobium stannide, a film of a solder-wettable metal over the superconductive coating, with a layer of soft solder over the film. The various coatings are not shown in the drawing for greater clarity. The filaments are bonded to the metallic ribbons by passing them through a heated jig as described in Example I. If desired, a second metallic ribbon may be bonded to that side of filaments 83 and 84 opposite the first metallic ribbon 80.

Example IX

In this example, a plurality of flexible coated filaments are bonded between a plurality of metallic ribbons, utilizing both horizontal and vertical stacking. Referring now to FIGURE 12, three coated flexible filaments 90, 91 and 92 are aligned parallel to each other in a horizontal plane, and are bonded between two metallic ribbons 93 and 94. Three more coated flexible filaments 95, 96 and 97 are aligned parallel to each other in a horizontal plane, and in vertical alignment with filaments 90, 91 and 92 respectively. Filaments 95, 96 and 97 are bonded between metallic ribbons 94 and 98. Each of the flexible filaments 90, 91, 92, 95, 96 and 97 has a coating of a Type II superconductor, a film of a solder-wettable metal over the superconductor, and a layer of soft solder over the film. These various coatings are not shown for greater clarity. The filaments and the metallic ribbons are bonded by means of the soft solder layer in a manner similar to that previously described in Example I.

It will be understood that the above examples are by way of example only, and not by way of limitation. Other Type II superconductive materials may be utilized instead of niobium stannide. The same product may be made without using a bath of molten solder, for example by using copper ribbons which are pre-tinned with a soft solder. Alternatively, after the filamentary substrate is given a coating of niobium stannide, and a film of a solder-wettable metal such as nickel is deposited on the superconductive coating, a layer of tin or lead or soft solder may be deposited by electroplating directly on the solder-wettable film. Various other modifications may be made without departing from the spirit and scope of the invention as set forth in the specification and the appended claims.

What is claimed is:

1. A laminate comprising a flexible filamentary substrate consisting of a metallic non-superconductor;
- a superconductive coating of niobium stannide on said substrate;
- a solder-wettable metallic film comprising a member of the group consisting of nickel and cobalt and silver on said superconductive coating;
- a layer of soft solder comprising at least one element of the group consisting of lead, tin, indium, gallium, zinc, cadmium and alloys of these elements, on said metallic film;
- and at least one ribbon of a metal selected from the group consisting of copper and aluminum bonded to said coated substrate by said layer of solder.

2. A laminate as in claim 1, wherein said film consists of a flash of nickel covered by a flash of silver.

3. A laminate as in claim 1, wherein two metallic ribbons are bonded to two opposing sides of said coated substrate by two layers of said soft solder respectively.

4. A laminate as in claim 3, wherein said two metallic ribbons are wider than said coated substrate.

5. A laminate comprising a plurality of flexible filamentary metallic non-superconductive substrates, each said substrate having a superconductive niobium stannide coating thereon, a solder-wettable metallic film comprising at least one member of the group consisting of nickel, cobalt and silver on said superconductive coating. and a layer of soft solder on said metallic film, said solder comprising at least one member of the group consisting of lead, tin, indium, gallium, zinc, cadmium and alloys of these elements, said plurality of substrates being bonded by said soft solder layer between opposing metallic ribbons, said ribbons being selected from the group consisting of copper and aluminum.

6. A laminate as in claim 5, wherein in addition to said plurality of flexible substrates, a non-superconductive metallic filament is bonded between said opposing metallic ribbons.

7. A laminate as in claim 5, where at least one of said metallic ribbons has a slot along its length, and one of said filamentary substrates is disposed within said slot.

References Cited

UNITED STATES PATENTS

| | | | |
|---|---|---|---|
| 3,184,303 | 5/1965 | Grobin | 29—194 X |
| 3,293,009 | 12/1966 | Allen | 29—194 X |
| 3,320,661 | 5/1967 | Manko. | |
| 3,352,008 | 11/1967 | Fairbanks | 29—599 |
| 3,395,000 | 7/1968 | Hanak | 29—194 |
| 3,397,084 | 8/1968 | Krieglstein | 29—194 X |

HYLAND BIZOT, Primary Examiner

U.S. Cl. X. R.

29—199